(12) United States Patent
Kent et al.

(10) Patent No.: US 8,605,661 B2
(45) Date of Patent: Dec. 10, 2013

(54) METHOD AND SYSTEM FOR IMPLEMENTING A SINGLE WEIGHT SPATIAL MULTIPLEXING (SM) MIMO SYSTEM

(75) Inventors: Mark Kent, Vista, CA (US); Vinko Erceg, Cardiff, CA (US); Uri M. Landau, San Diego, CA (US); Pieter Van Rooyen, San Diego, CA (US); Pieter Roux, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/554,652

(22) Filed: Jul. 20, 2012

(65) Prior Publication Data

US 2012/0281794 A1 Nov. 8, 2012

Related U.S. Application Data

(63) Continuation of application No. 11/173,726, filed on Jun. 30, 2005, now Pat. No. 8,254,306.

(60) Provisional application No. 60/616,734, filed on Oct. 6, 2004.

(51) Int. Cl.
*H04B 7/02* (2006.01)
*H04B 7/00* (2006.01)
*H04B 17/02* (2006.01)
*H04W 4/00* (2009.01)

(52) U.S. Cl.
USPC ........ 370/328; 455/136; 455/137; 455/278.1; 375/267; 375/345; 375/346; 375/349

(58) Field of Classification Search
USPC .................. 370/328, 310; 455/136, 137, 139, 455/236.1, 276.1, 278.1; 375/267, 345, 375/346, 347, 349
See application file for complete search history.

(56) References Cited

U.S. PATENT DOCUMENTS

| 6,029,056 A * | 2/2000 | Kiyanagi et al. ........... 455/276.1 |
| 6,128,330 A | 10/2000 | Schilling |
| 6,208,632 B1 | 3/2001 | Kowalski et al. |
| 6,757,322 B2 | 6/2004 | Schilling |

(Continued)

OTHER PUBLICATIONS

Mietzner et al., University of Kiel, "Adaptive Antennas and MIMO Systems for Wireless Communications, Boosting the Performance of Wireless Communication Systems: Theory and Practice of Multiple-Antenna Techniques," IEEE Communications Magazine, Oct. 2004, pp. 40-47.

(Continued)

*Primary Examiner* — Wesley Kim
(74) *Attorney, Agent, or Firm* — Sterne, Kessler, Goldstein & Fox P.L.L.C.

(57) ABSTRACT

Certain aspects of the method may comprise generating at least one control signal that may be utilized to control at least a first of a plurality of received spatially multiplexed communication signals. An amplitude and/or phase of the first received spatially multiplexed communication signal may be adjusted via the generated control signal so that the amplitude and/or phase of the first received spatially multiplexed communication signal may be equivalent to an amplitude and/or phase of a second received spatially multiplexed communication signal. The amplitude of the first received spatially multiplexed communication signal is adjusted within the processing path used to process the first received spatially multiplexed communication signal.

19 Claims, 7 Drawing Sheets

(56) References Cited

U.S. PATENT DOCUMENTS

| | | | |
|---|---|---|---|
| 6,963,619 B1 | 11/2005 | Gesbert et al. | |
| 7,184,500 B2 * | 2/2007 | Li et al. | 375/347 |
| 7,324,794 B2 * | 1/2008 | Chari et al. | 455/130 |
| 7,418,067 B1 * | 8/2008 | Li | 375/347 |
| 2002/0196842 A1 | 12/2002 | Onggosanusi et al. | |
| 2005/0243898 A1 | 11/2005 | Reznik et al. | |

OTHER PUBLICATIONS

Haykin et al., McMaster University and Communications Research Centre Canada, "Adaptive Antennas and MIMO Systems for Wireless Communications, Turbo-MIMO for Wireless Communications," IEEE Communications Magazine, Oct. 2004, pp. 48-53.

Love et al., Purdue University, University of Texas at Austin, and Northwestern University, "Adaptive Antennas and MIMO Systems for Wireless Communications, What is the Value of Limited Feedback for MIMO Channels?" IEEE Communications Magazine, Oct. 2004, pp. 54-59.

Spencer et al., Distribution Control Systems, Inc., Swiss Federal Institute of Technology, Brigham Young University, Ilmenau University of Technology, "Adaptive Antennas and MIMO Systems for Wireless Communications, An Introduction to the Multi-User MIMO Downlink," IEEE Communications Magazine, Oct. 2004, pp. 60-67.

Sanayei et al., University of Texas at Dallas, "Adaptive Antennas and MIMO Systems for Wireless Communications, Antenna Selection in MIMO Systems," IEEE Communications Magazine, Oct. 2004, pp. 68-73.

Nosratinia et al., University of Texas, Dallas, and Nortel Networks, "Cooperative Communication in Wireless Networks," IEEE Communications Magazine, Oct. 2004, pp. 74-80.

Jack H. Winters, Member IEEE, "Optimum Combining for Indoor Radio Systems with Multiple Users," IEEE Transactions on Communications, vol. Com-35, No. 11, Nov. 1987, pp. 1222-1230.

* cited by examiner

METHOD AND SYSTEM FOR IMPLEMENTING A SINGLE WEIGHT SPATIAL MULTIPLEXING (SM) MIMO SYSTEM

CROSS-REFERENCE TO RELATED APPLICATIONS/INCORPORATION BY REFERENCE

This patent application makes reference to, claims priority to, claims benefit from, and incorporates by reference herein in its entirety U.S. patent application Ser. No. 11/173,726 filed on Jun. 30, 2005, which claims priority to U.S. Provisional Patent Application Ser. No. 60/616,734 filed on Oct. 6, 2004.

This application makes reference to:
U.S. patent application Ser. No. 11/173,870 filed Jun. 30, 2005;
U.S. patent application Ser. No. 11/174,303 filed Jun. 30, 2005;
U.S. patent application Ser. No. 11/173,502 filed Jun. 30, 2005;
U.S. patent application Ser. No. 11/173,871 filed Jun. 30, 2005;
U.S. patent application Ser. No. 11/173,964 filed Jun. 30, 2005;
U.S. patent application Ser. No. 11/173,252 filed Jun. 30, 2005;
U.S. patent application Ser. No. 11/174,252 filed Jun. 30, 2005;
U.S. patent application Ser. No. 11/172,756 filed Jun. 30, 2005;
U.S. patent application Ser. No. 11/173,305 filed Jun. 30, 2005;
U.S. patent application Ser. No. 11/172,759 filed Jun. 30, 2005;
U.S. patent application Ser. No. 11/173,689 filed Jun. 30, 2005;
U.S. patent application Ser. No. 11/173,304 filed Jun. 30, 2005;
U.S. patent application Ser. No. 11/173,219 filed Jun. 30, 2005;
U.S. patent application Ser. No. 11/172,779 filed Jun. 30, 2005;
U.S. patent application Ser. No. 11/172,702 filed Jun. 30, 2005;
U.S. patent application Ser. No. 11/173,727 filed Jun. 30, 2005;
U.S. patent application Ser. No. 11/172,781 filed Jun. 30, 2005;
U.S. patent application Ser. No. 11/174,067 filed Jun. 30, 2005;
U.S. patent application Ser. No. 11/173,854 filed Jun. 30, 2005;
U.S. patent application Ser. No. 11/173,911 filed Jun. 30, 2005; and
U.S. patent application Ser. No. 11/174,403 filed Jun. 30, 2005.

The above referenced applications are hereby incorporated herein by reference in their entirety.

BACKGROUND OF THE INVENTION

1. Field of the Invention

Certain embodiments of the invention relate to spatial multiplexing in a MIMO system. More specifically, certain embodiments of the invention relate to a method and system for implementing a single weight spatial multiplexing multi-input multi-output (MIMO) system.

2. Background Art

In most current wireless communication systems, nodes in a network may be configured to operate based on a single transmit and a single receive antenna. However, for many of current wireless systems, the use of multiple transmit and/or receive antennas may result in an improved overall system performance. These multi-antenna configurations, also known as smart antenna techniques, may be utilized to reduce the negative effects of multipath and/or signal interference may have on signal reception. Existing systems and/or systems which are being currently deployed, for example, CDMA-based systems, TDMA-based systems, WLAN systems, and OFDM-based systems such as IEEE 802.11a/g/n, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers. Accordingly, N signals may be simultaneously transmitted in the same bandwidth using N transmit antennas, with the transmitted signal then being separated into N respective signals by way of a set of N antennas deployed at the receiver. Systems that utilize multiple transmit and multiple receive antenna may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. The necessity of providing a separate RF chain for each transmit and receive antenna is a direct factor in the increased the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for implementing a single weight spatial multiplexing multi-input multi-output (MIMO) system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of the method may comprise generating at least one control signal that may be utilized to control at least a first of a plurality of received spatially multiplexed communication signals. An amplitude of the first received spatially multiplexed communication signal may be adjusted via the generated control signal so that the amplitude of the first received spatially multiplexed communication signal may be equivalent to an amplitude of a second received spatially multiplexed communication signal. The amplitude of the first received spatially multiplexed communication signal is adjusted within the processing path used to process the first received spatially multiplexed communication signal. A phase of the first received spatially multiplexed communication signal may be adjusted via the generated control signal so that the phase of the first received spatially multiplexed communication signal may be equivalent to a phase of a second received spatially multiplexed communication signal. The phase of the first received spatially multiplexed communication signal may be adjusted within a processing path used to process the first received spatially multiplexed communication signal.

The generated control signal may comprise a single weight signal. The amplitude of the first received spatially multiplexed communication signal may be adjusted continuously and/or at discrete intervals. The first received spatially multiplexed communication signal may be amplified so that a gain of the first received spatially multiplexed communication signal may be equivalent to a gain of the second received spatially multiplexed communication signal. The amplitude-adjusted first received spatially multiplexed communication signal may be combined with the second received spatially multiplexed communication signals to generate a combined received spatially multiplexed communication signal. A plurality of baseband combined channel estimates of a time varying impulse response for the plurality of received spatially multiplexed communication signals may be generated and the baseband combined channel estimates of the time varying impulse response may be utilized to generate a plurality of control signals. The control signals may be generated utilizing one or more optimization algorithms, such as a maximum signal-to-noise ratio (SNR) algorithm, a maximum signal-to-interference-and-noise ratio (SINR) algorithm, and/or a minimum bit error rate (BER) algorithm.

Spatial multiplexing (SM) may provide a mode of signal transmission predicated upon the use of multiple antennas at both a transmitter and a receiver, for example, in such a way that the capacity of a wireless radio link may be increased without correspondingly increasing power or bandwidth consumption. In a case in which N antennas are used at both a transmitter and a receiver, an input stream of information symbols provided to the transmitter is divided into N independent substreams. Spatial multiplexing contemplates that each of these N independent substreams may occupy the same "space-time channel", for example, time slot, frequency, or code/key sequence, of the applicable multiple-access protocol. Within the transmitter, each substream may be separately applied to the N transmit antennas and propagated over an intervening multipath communication channel to a receiver. Error correction coding may be applied to each of the N streams separately or in a combined space-time methodology.

The composite multipath signals may then be received by an array of N or more receive antennas deployed at the receiver. At the receiver, a "spatial signature" defined by the N phases and N amplitudes arising at the receive antenna array for a given substream may be then estimated. Signal processing techniques may be then applied in order to spatially separate the received signals, which may allow the original substreams to be recovered and synthesized into the original input symbol stream. An overall system capacity of the order of the minimum of M and N, min(M,N), for example, may be achieved, where M may be the number of receive antennas and N may be the number of transmit antennas for flat fading channel conditions. The principles of spatially multiplexed communication and exemplary system implementations are further described in, for example, "Optimum combining for indoor radio systems with multiple users", by J. H. Winters, IEEE Transactions on Communications, Vol. COM-35, No. 11, November 1987, which is hereby incorporated by reference in its entirety.

Figure 1:
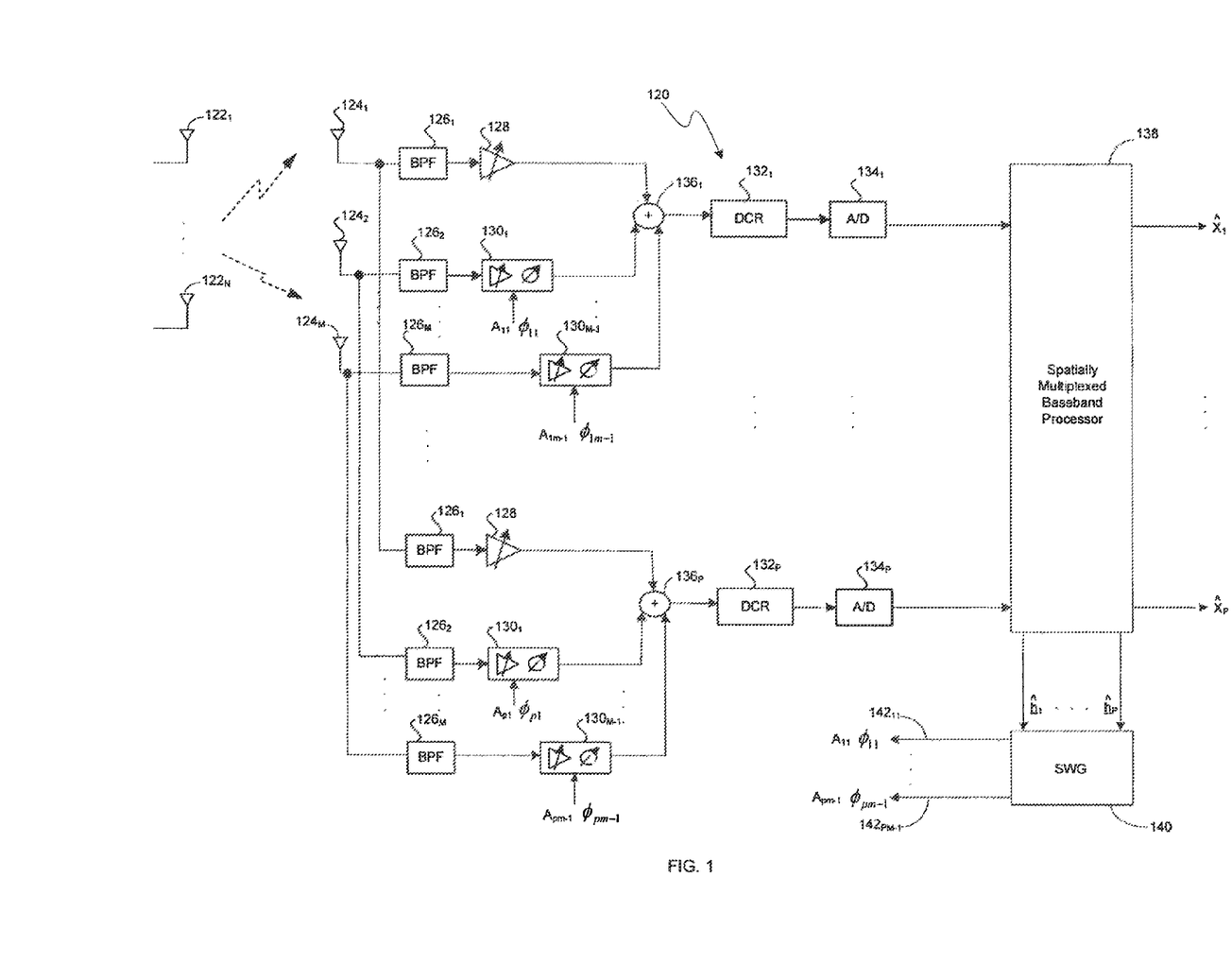
FIG. 1 is a block diagram of a configuration of an exemplary single weight spatially multiplexed MIMO system, in accordance with an embodiment of the invention.

FIG. 1 is a block diagram of an exemplary single weight spatially multiplexed MIMO system, in accordance with an embodiment of the invention. Referring to FIG. 1, there is shown a transceiver 100. The transceiver 100 may comprise a plurality of transmit antennas $122_{1...N}$, a plurality of receive antennas $124_{1...M}$, a plurality of band pass filters (BPFs) $126_{1...M}$, a low noise amplifier 128, a plurality of phase shifter/LNA (PSLNA) blocks $130_{1...M-1}$, a plurality of direct conversion radio (DCR) blocks $132_{1...P}$, a plurality of analog-to-digital (A/D) converters $134_{1...P}$, a plurality of summers $136_{1...P}$, a spatially multiplexed baseband processor (SMBB) 138 and a single weight generator (SWG) 140.

The plurality of transmit antennas $122_{1...N}$ may transmit processed spatially multiplexed RF signals to a plurality of receive antennas $124_{1...M}$. On the receive side, the plurality of BPFs $126_{1...M}$ may comprise suitable logic, circuitry, and/or code and may be adapted to receive a plurality of spatially multiplexed RF signals from the plurality of receive antennas $124_{1...M}$. The plurality of BPFs $126_{1...M}$ may then limit frequencies of the received spatially multiplexed signals to a pre-determined band of frequencies, and output that band of frequencies to the LNA 128 and the plurality of PSLNA blocks $130_1 \ldots {}_{M-1}$. The advantage of spatially multiplexing techniques lies in the fact that the same bandwidth may be used for all the transmit data streams. The LNA 128 and the plurality of PSLNA blocks $130_1 \ldots {}_{M-1}$ may comprise suitable logic, circuitry, and/or code and may be adapted to receive a plurality of input signals, amplify the signals and adding phase shifts while introducing very little additional noise or distortion. In addition, the LNA within the PSLNA blocks $130_1 \ldots {}_{M-1}$ may be adapted to receive as an input an amplified signal, shift the phase of the signal, and generate a resulting output phase-shifted signal. The plurality of PSLNA blocks $130_1 \ldots {}_{M-1}$ may be adapted to receive a plurality of SW control signals $142_{11}$ to $142_{PM-1}$ from SWG 140 to modify the phase and/or amplitude of the plurality of received spatially multiplexed communication signals.

The plurality of DCR blocks $132_1 \ldots {}_P$ may comprise suitable logic, circuitry and/or code and may be adapted to amplify and convert the received analog RF signal down to baseband. For example, the DCR block $132_1$ may utilize a number of amplifier stages implemented with for example, LNAs, a complex in-phase and quadrature signal component mixer, and/or a low pass channel filter. The plurality of A/D converters $134_1 \ldots {}_P$ may comprise suitable logic, circuitry, and/or code that may be adapted to receive an analog signal from the plurality of DCR blocks $132_1 \ldots {}_P$ and generate a corresponding output digital signal, which may be communicated to the SMBB 138. The digital signal may sample the analog signal at a pre-defined rate.

The SMBB 138 may comprise, for example, suitable logic, circuitry and/or code that may be adapted to perform baseband processing. The SMBB 138 may perform, for example, demodulation, decoding and spatial demultiplexing on the received baseband signals. The SMBB 138 may be adapted to receive a plurality of digital RI signals from the plurality A/D converters $134_1 \ldots {}_P$ and generate a plurality of baseband combined channel estimates $\hat{h}_1$ to $\hat{h}_P$ and a plurality of channel estimates $\hat{X}_1$ to $\hat{X}_P$ of the original channel over which the input signals $X_1$ to $X_P$ propagate. The spatial multiplexing processor 138 may be adapted to separate the different space-time channels utilizing a Bell Labs Layered Space-Time (BLAST) algorithm, for example, by performing sub-stream detection and sub-stream cancellation. The transmission capacity may be increased almost linearly by utilizing the BLAST algorithm and assuming good channel estimation and cancellation.

The SWG 140 may include, for example, suitable logic, circuitry and/or code that may be adapted to determine the phase and/or the amplitude utilized in combining the received spatially multiplexed communication signals from the plurality of receive antennas $124_1 \ldots {}_M$. The SWG 140 may generate SW control signals that may be utilized to tune the amplitude and phase shifters of the PSLNA blocks $130_1 \ldots {}_{M-1}$. The SWG 140 may generate the signal based on, for example, one or more of the following optimization algorithms: maximum signal-to-noise ratio (SNR), maximum signal-to-interference-and-noise ratio (SINR), minimum bit error rate (BER) and/or other optimization algorithms. The SWG block 140 may be adapted to receive a plurality of baseband combined channel estimates $\hat{h}_1$ to $\hat{h}_P$ from the SMBB 138. The SWG block 140 may be adapted to generate a plurality of single weight control signals $142_{11}$ to $142_{PM-1}$ to modify the phase and/or amplitude of the plurality of received spatially multiplexed communication signals.

In one aspect of the invention, the plurality of PSLNA blocks $130_1 \ldots {}_{M-1}$ may be utilized to shift the phase of the spatially multiplexed signals received at antennas $124_2 \ldots {}_M$ so that it is in-phase with the signal received at antenna $124_1$. For example, the PSLNA block $130_1$ may receive a single weight (SW) control signal $A_{11}, \phi_{11}\ 142_{11}$, which may be generated by the single weight generator (SWG) 140. The PSLNA block $130_1$ may then shift the phase of the signal received at antenna $124_2$ based on the received SW control signal $142_{11}$. In this regard, the signals received at antennas $124_1$ to $124_M$ for the first substream may be in phase at summer $136_1$. The following sub streams (2 to P) may also be in phase at each of the corresponding summer blocks (2 to P). In addition, the LNA within the PSLNA block $130_1$ and the LNA 128 may amplify the respective signals received from antennas $124_1$ and $124_M$ so that balanced gain is achieved for both signals at summer $136_1$.

The plurality of PSLNA blocks $130_2 \ldots {}_{M-1}$ may each receive a single weight (SW) control signal $A_{12}, \phi_{12}\ 142_{12}$ to $A_{1M-1}, \phi_{1M-1}\ 142_{1M-1}$, which may be generated by the single weight generator (SWG) 140. The outputs generated by the plurality of PSLNA blocks $130_2 \ldots {}_{M-1}$ may be summed by the summer $136_1$, which generates a RF signal to the DCR block $132_1$. The DCR block $132_1$ may comprise suitable logic, circuitry and/or code and may be adapted to amplify and convert the received analog RF signal down to baseband. The A/D converter $134_1$ may comprise suitable logic, circuitry, and/or code that may be adapted to receive an analog signal from the DCR block $132_1$ and generate a corresponding output digital signal, which may be communicated to the spatially multiplexed baseband processor (SMBB) 138. The SMBB 138 may be adapted to generate an estimate $\hat{X}_1$ of the original input signal $X_1$. Similarly, the SMBB 138 may be adapted to generate a plurality of estimates $\hat{X}_2$ to $\hat{X}_P$ of the original input signals $X_2$ to $X_P$.

The SMBB 138 may be adapted to generate a plurality of baseband combined channel estimates $\hat{h}_1$ to $\hat{h}_P$ to the SWG block 140. The SWG block 140 may be adapted to generate a plurality of SW control signals $142_{11}$ to $142_{1M-1}$ to the plurality of PSLNA blocks $130_1 \ldots {}_{M-1}$ for the first RF path to generate the estimate $\hat{X}_1$ of the original input signal $X_1$. Similarly, the SWG block 140 may be adapted to generate a plurality of SW control signals $142_{21}$ to $142_{PM-1}$ to the plurality of PSLNA blocks $130_1 \ldots {}_{M-1}$ for the successive RF paths to generate the plurality of estimates $\hat{X}_2$ to $\hat{X}_P$ of the original input signals $X_2$ to $X_P$. The plurality of SW control signals may be generated utilizing one or more optimization algorithms, such as a maximum signal-to-noise ratio (SNR) algorithm, a maximum signal-to-interference-and-noise ratio (SINR) algorithm, and/or a minimum bit error rate (BER) algorithm.

Figure 2:
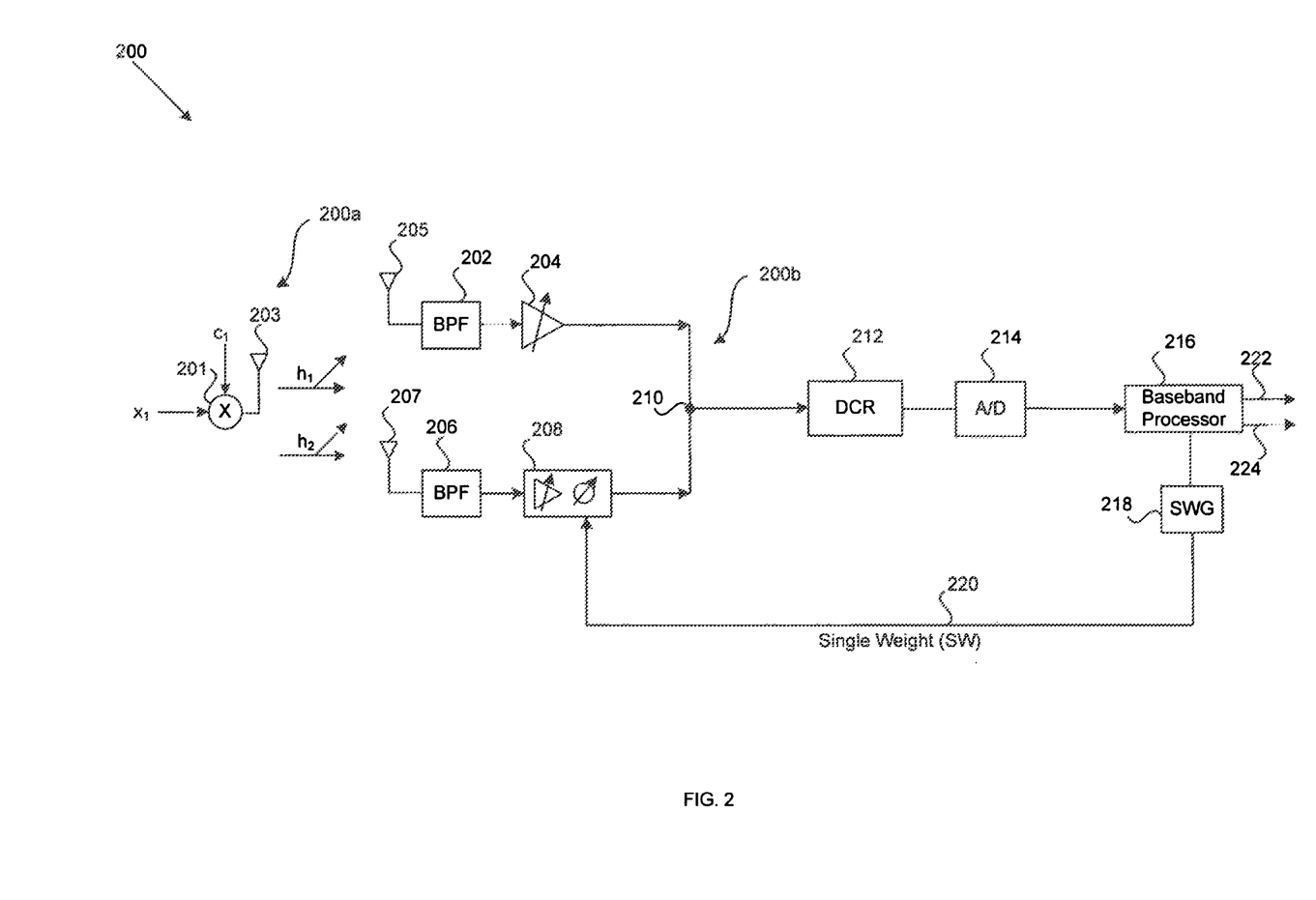
FIG. 2 is a block diagram of an exemplary single weight single channel system for WCDMA, in accordance with an embodiment of the invention.

FIG. 2 is a block diagram of an exemplary single weight single channel system for WCDMA, in accordance with an embodiment of the invention. Referring to FIG. 2, the single weight single channel system 200 for WCDMA may comprise a transmitter section 200a and a receiver section 200b. The transmitter section 200a may comprise a mixer 201 and antenna 203. Data input $x_1$ and code $c_1$ are inputs to the mixer 201. The receiver section 200b may comprise antennas 205 and 207, bandpass filters (BPF) 202 and 206, low noise amplifier (LNA) 204, phase shifter/LNA (PSLNA) block 208, a direct conversion radio (DCR) block 212, an analog-to-digital (A/D) converter 214, a baseband processor 216, and a single weight generator (SWG) 218.

On the transmit side, the mixer 201 may be adapted to mix the data input $x_1$ with code $c_1$. The actual time varying impulse response of the channel is represented by $h_1$ and $h_2$ per base station. The estimates of the actual time varying impulse response of the channel are represented by $\hat{h}_1$ and $\hat{h}_2$ per base station.

On the receive side, the BPFs 202 and 206 may comprise suitable logic, circuitry, and/or code and may be adapted to receive as an input an RF signal from the antennas 205 and 207, respectively. The BPFs 202 and 206 may then limit the frequencies of the signal to a pre-determined band of frequencies, and output that band of frequencies to the LNA 204 and the PSLNA block 208. The LNA 204 and the PSLNA block 208 may comprise suitable logic, circuitry, and/or code and may be adapted to receive as an input a signal, and amplify the signal while introducing very little additional noise. In addition, the LNA within the PSLNA block 208 may be adapted to receive as an input an amplified signal, shift the phase of the signal, and output a resulting phase-shifted signal.

In one aspect of the invention, the PSLNA block 208 may be utilized to shift the phase of the signal received at antenna 207 so that it is in-phase with the signal received at antenna 205. For example, the PSLNA block 208 may receive a single weight (SW) control signal 220, which may be generated by the single weight generator (SWG) 218. The PSLNA block 208 may then shift the phase of the signal received at antenna 207 based on the received SW control signal 220. In this regard, the two signals received at antennas 205 and 207 may be in phase at point 210. In addition, the LNA within the PSLNA block 208 and the LNA 204 may amplify the respective signals received from antennas 207 and 205 so that balanced gain is achieved for both signals at point 210.

The DCR block 212 may comprise suitable logic, circuitry and/or code and may be adapted to amplify and convert the received analog RF signal down to baseband. For example, the DCR block 212 may utilize a number of amplifier stages implemented with LNAs, a complex in-phase and quadrature signal component mixer, and a low pass channel filter. The A/D converter 214 may comprise suitable logic, circuitry, and/or code that may be adapted to receive an analog signal from the DCR block 212 and generate a corresponding output digital signal, which may be communicated to the baseband processor 216. The digital signal may sample the analog signal at a pre-defined rate.

The baseband processor 216 may comprise suitable logic, circuitry and/or code that may be adapted to process a digital signal and generate a voice output signal 222 and a data output signal 224. In addition, the baseband processor 216 may be adapted to generate output signals that may be utilized by the SWG block 218 for generating the SW 220 for control of the phase shifting in the PSLNA block 208. The voice output signal 222 may be further processed by a voice processing unit and/or a digital display processor, respectively, for example.

The SWG block 218 may comprise suitable circuitry, logic, and/or code and may be adapted to process channel function estimates and RF signal timing information received from the baseband processor 216, for example, and generate a single weight (SW) 220. The SW 220 may be utilized by the PSLNA block 208 to phase-shift an RF signal received at antenna 207 and generate an RF signal that is in-phase with a signal received at antenna 205.

In operation, the transmitter side 200a may be adapted to mix the input data signal $x_1$ with the code signal $c_1$ and then transmitted the signal via antenna 203 over the air. As the signal is transmitted over the air, it may traverse a plurality of different paths or multipaths due to reflections. The actual time varying impulse response of the channel over which the signals traverse is represented by $h_1$ and $h_2$ per base station.

The estimates of the actual time varying impulse response of the channel are represented by $\hat{h}_1$ and $\hat{h}_2$ per base station. The transmitted signal may then be received via various paths where actual time varying impulse response of the channel is represented by $\hat{h}_1$ and $\hat{h}_2$ per base station. The signal received by the antennas 205 and 207 may be bandpass filtered by BPFs 202 and 206, respectively, and amplified by the LNA 204 and the PSLNA block 208, respectively. In addition, the PSLNA block 208 may receive SW control signal 220 from the SWG block 218 and may adjust the phase of the signal received at antenna 207 based on the SW 220. In this regard, the signal received at antenna 207 may be in-phase with the signal received at antenna 205. In addition, the gains of the two signals received at antennas 205 and 207 may be adjusted so that there may be a gain balance at point 210 in the receiver side 200b.

The RF signal may then be processed by the DCR block 212 and may be further amplified, mixed with a VCO signal, and/or low pass filtered. The RF analog signal processed by the DCR block may be converted to a digital signal by the A/D 214. The digital output of the A/D 214 may be communicated as an input to the baseband processor 216. The baseband processor 216 may further process the input to generate a voice signal 222 and a data signal 224. The voice signal 222 may be further processed, for example, by a voice processing system, and the data signal 224 may be further processed by a display processor, for example. In addition, the baseband processor 216 may be adapted to generate signals that may be utilized by the SWG 218 for generating the signal SW 220.

Even though the transmit side 200a utilizes one antenna 203, the present invention may not be limited in this regard and multiple transmit antennas may be utilized in accordance with various aspects of the invention. Similarly, in accordance with a different aspect of the invention, multiple receive antennas may be utilized on the receive side 200b. In addition, even though phase adjustment techniques utilizing a single weight value on one or more signals is implemented on the receive side 200b, the invention is not so limited. Phase adjustment techniques in accordance with the present invention, utilizing a single weight value on one or more signals may also be implemented on the transmit side 200a.

Figure 3:
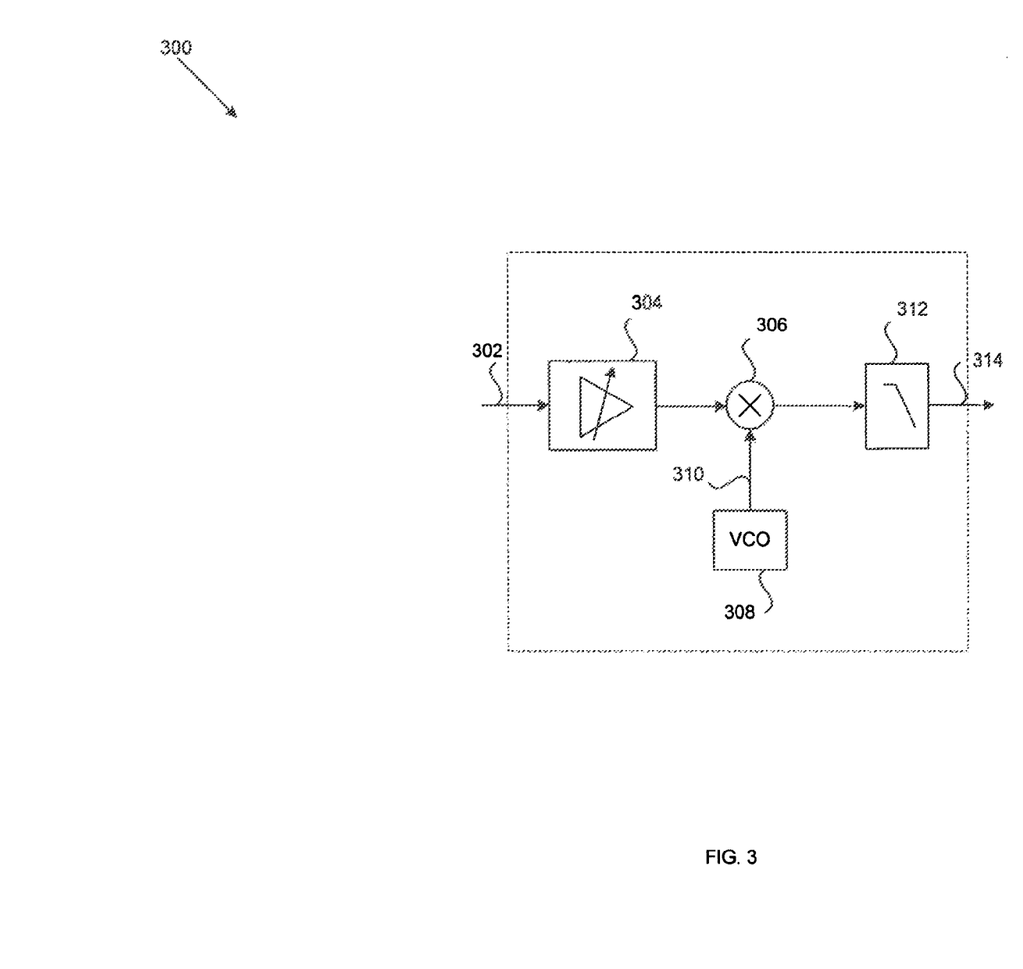
FIG. 3 is a block diagram of a direct conversion radio block that may be utilized in accordance with an aspect of the invention.

FIG. 3 is a block diagram of a direct conversion radio block that may be utilized in accordance with an aspect of the invention. Referring to FIG. 3, the direct conversion radio (DCR) block 300 may comprise suitable logic, circuitry, and/or code and may be adapted to amplify and convert the received analog RF signal down to baseband. In an exemplary aspect of the invention, the DCR block 300 may comprise an LNA 304, a voltage controlled oscillator (VCO) 308, a mixer 306, and a low pass filter (LPF) 312.

The LNA 304 may receive an RF signal 302 and amplify it based on a determined gain level. The VCO 308 may comprise suitable logic, circuitry and/or code and may be adapted to output a signal of a specific frequency which may be pre-determined, or controlled by a voltage signal input to the VCO. The VCO signal may be mixed by the mixer 306 with the amplified signal received from the LNA 304. The LPF 312 may comprise suitable logic, circuitry and/or code and may be adapted to receive the mixed signal from the mixer 306, limit the frequencies of the mixed signal to a determined range of frequencies up to a certain upper limit frequency, and output that range of frequencies as a baseband signal 314.

Figure 4A:
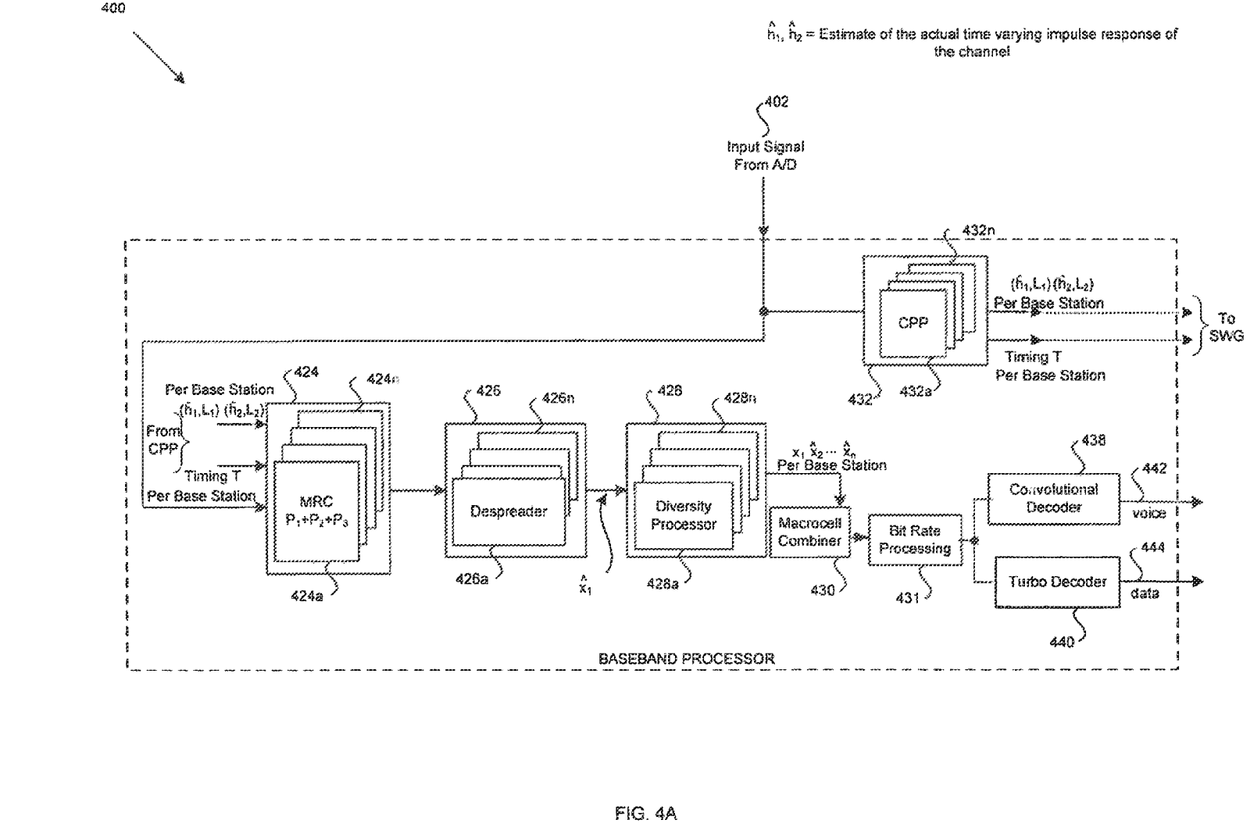
FIG. 4A is a block diagram of an exemplary baseband processor that may be utilized within a MIMO system, in accordance with an aspect of the invention.

FIG. 4A is a block diagram of an exemplary baseband processor that may be utilized within a MIMO system, in accordance with an aspect of the invention. Referring to FIG. 4A, the baseband processor 400 may comprise a cluster path processor (CPP) block 432, a maximum ratio combining (MRC) block 424, a despreader block 426, a diversity processor block 428, a macrocell combiner block 430, a bit rate processing block 431, a convolutional decoder block 438, and a turbo decoder block 440.

U.S. application Ser. No. 11/173,854 provides a detailed description of signal clusters and is hereby incorporated herein by reference in its entirety.

The CPP block 432 may comprise a plurality of cluster processors that may be adapted to receive and process an input signal 402 received from a chip matched filter (CMF), for example. In the baseband receiver processor 400, the CPPs 432a, ..., 432n within the CPP block 432 may be partitioned into pairs of processors, wherein each pair of processor may be adapted to track time-wise and estimate the complex phase and amplitude of the element in the cluster. A cluster may comprise an aggregate of received multipath signals with maximum (max) time difference that may be no more than 16×1/3.84e6 seconds, for example. Under these circumstances, the need for two processors may be derived from the fact that the WCDMA standard facilitates a receiving mode in which the transmitted signal is transmitted over two antennas, which necessitates the two processors. These receiving modes comprise close loop 1 (CL1), close loop 2 (CL2), and STTD. The CPP block 432 may be adapted to determine estimates of the entire transfer function of the channel and may recover channels on a per base station basis.

The CPP block 432 may be adapted to generate channel estimates $\hat{h}_1$ and $\hat{h}_2$ of the actual time varying impulse response of the channel per base station. The CPP 432 may also generate timing information T on per base station basis related to signals received by antennas at the receive side, such as antennas 205 and 207 of FIG. 2, for example. Corresponding lock indicators $L_1$ and $L_2$ may also be generated by the cluster processors. The lock indicators may provide an indication of which components in the corresponding estimates comprise valid component values. In one embodiment of the invention, cluster path processors 432a, ..., 432n may be configured to operate in pairs when a transmitted signal is transmitted by two antenna, where the two antenna may be located in the same base station, or at different base stations. The channel estimates $\hat{h}_1$ and $\hat{h}_2$ of the actual time varying impulse response of the channel per base station, as well as lock indicators L1 and L2, and the timing information T per base station may be communicated to a single weight generation (SWG) block, for example, as well as to the maximum-ratio combining (MRC) block 424 for further processing. The channel estimates $\hat{h}_1$ and $\hat{h}_2$, the lock indicators L1 and L2, and the timing information T may be utilized by an SWG block for generating a single weight (SW) control signal for phase shifting of one or more signals received by receiver antennas.

The maximum-ratio combining block 424 may comprise suitable logic, circuitry and/or code to receive timing reference signals, T, and channel estimates and lock indicators, ($\hat{h}$1,L1) and ($\hat{h}$2,L2), from the corresponding cluster path processor block 432, which may be utilized by the maximum-ratio combining block 424 to process received signals from a chip matched filter (CMF) block, for example. The maximum ratio combining block 424 may utilize channel estimate components that are valid in accordance with the corresponding lock indicator. Channel estimate components that are not valid, in accordance with the corresponding lock indicator, may not be utilized. The maximum-ratio combining block 424 may be adapted to provide a combining scheme or mechanism for implementing a rake receiver which may be utilized with adaptive antenna arrays to combat noise, fading, and/or co-channel interference.

In accordance with an embodiment of the invention, the maximum-ratio combining block 424 may comprise suitable logic, circuitry, and/or code that may be adapted to add individual distinct path signals, received from the assigned RF channel, together in such a manner to achieve the highest attainable signal to noise ratio (SNR). The highest attainable SNR may be based upon a maximum ratio combiner. A maximum ratio combiner is a diversity combiner in which each of multipath signals from all received multipaths are added together, each with unique gain. The gain of each multipath before summing can be made proportional to received signal level for the multipath, and inversely proportional to the multipath noise level. Each of the maximum-ratio combining blocks may be also adapted to utilize other techniques for signal combining such selection combiner, switched diversity combiner, equal gain combiner, or optimal combiner.

In one embodiment of the invention, the assignment of fingers in the maximum-ratio combining block 424 may be based on channel estimates h1 and h2 from the cluster path processor block 432. The proportionality constants utilized in the maximum-ratio combining block 424 may be based on the valid channel estimates, $\hat{h}$1 and $\hat{h}$2, from the cluster path processor block 432.

The despreader (DS) block 426 may comprise a plurality of despreader blocks 426a, ..., 426n. Each of the despreader blocks 426a, ..., 426n may comprise suitable logic, circuitry, and/or code that may be adapted to despread received signals that may have been previously spread through the application of orthogonal spreading codes in the transmitter. Prior to transmission of an information signal, known as a "symbol", the transmitter may have applied an orthogonal spreading code that produced a signal comprising a plurality of chips. The DS block 426 may be adapted to generate local codes, for example Gold codes or orthogonal variable spreading factor (OVSF) codes, that may be applied to received signals through a method that may comprise multiplication and accumulation operations. Processing gain may be realized after completion of integration over a pre-determined number of chips in which the symbol is modulated.

Following despreading at the receiver, the original symbol may be extracted. WCDMA may support the simultaneous transmission of a plurality of spread spectrum signals in a single RF signal by utilizing spreading codes among the spread spectrum signals which are orthogonal to reduce multiple access interference (MAI). The receiver may extract an individual symbol from the transmitted plurality of spread spectrum signals by applying a despreading code, which may be equivalent to the code that was utilized for generating the spread spectrum signal. Similarly to the CPP block 432 and the MRC block 424, the DS block 426 may be assigned on a per base station basis, with the MRC block 424 communicating with the DS block 426 that may be assigned to the same base stations.

The diversity processor 428, comprising a plurality of diversity processor blocks 428a, ..., 428n, may comprise suitable logic, circuitry, and/or code that may be adapted to combine signals transmitted from multiple antennas in diversity modes. The diversity modes may comprise OL, CL1 and CL2. The diversity processor 428 may combine signals transmitted from multiple antennas that are located at the same base station. Similarly with the cluster path processors 432, the maximum-ratio combining blocks 424, and the despreader blocks 426, the diversity processors 428 may be assigned on a per base station basis, with the diversity processors 428 communicating with despreader blocks 426 that may be assigned to the same base stations.

The macrocell combiner 430 may comprise suitable logic, circuit and/or code and may be adapted to achieve macroscopic diversity. The macroscopic diversity scheme may be utilized for combining two or more long-term lognormal signals, which may be obtained via independently fading paths received from two or more different antennas at different base-station sites. The microscopic diversity schemes may be utilized for combining two or more short-term Rayleigh signals, which are obtained via independently fading paths received from two or more different antennas but only one receiving site.

The bit rate processing block 431 may comprise suitable logic, circuitry and/or code to process frames of data received from the macrocell combiner 430. The processing may further comprise depuncturing, and deinterleaving data in the received frame, and further determining a rate at which processed frames are communicated in output signals.

The convolutional decoder 438 may comprise suitable logic, circuitry and/or code that may be utilized to handle decoding of convolutional codes as indicated in the 3GPP specification. The output of the convolutional decoder 438 may be a digital signal, which comprises voice information, suitable for processing by a voice-processing unit. The turbo decoder 440 may comprise suitable logic, circuitry and/or code that may be utilized to handle decoding of turbo codes as indicated in the 3GPP specification. The output of the turbo decoder 440 may be a digital signal, which has data information, such that it may be suitable for use by a video display processor.

Referring to FIGS. 2 and 4A, in operation, the transmitter side 200a may be adapted to mix the input data signal $x_1$ with the code signal $c_1$ and generate the output signal, which may be transmitted via antenna 203 over different paths over the air. Each over the air path or channel has a corresponding time varying impulse response function $h_1$ and $h_2$. The channel estimates $\hat{h}_1$ and $\hat{h}_2$ provide estimates of the actual time varying impulse response of the channel over which the received signals are transmitted. The signal received by the antennas 205 and 207 may be bandpass filtered by BPFs 202 and 206, respectively, and amplified by the LNA 204 and the PSLNA block 208, respectively. In addition, the PSLNA block 208 may receive SW control signal 220 from the SWG block 218 and may adjust the phase of the signal received at antenna 207 based on the SW 220. In this regard, the signal received at antenna 207 may be in-phase with the signal received at antenna 205. In addition, the gains of the two signals received at antennas 205 and 207 may be adjusted so that there may be a gain balance at point 210 in the receiver side 200b.

The RF signal may then be processed by the DCR block 212 and may be further amplified, mixed with a VCO signal, and/or low pass filtered. The RF analog signal processed by the DCR block may be converted to a digital signal by the A/D 214. The digital output of the A/D 214 may be communicated as an input to the baseband processor 216. The baseband processor 216 may further process the input to generate a voice signal 222 and a data signal 224. The voice signal 222 may be further processed, for example, by a voice processing system or device, and the data signal 224 may be further processed by a display processor, for example. In addition, the baseband processor 216 may be adapted to generate signals that may be utilized by the SWG 218 in generating the signal SW 220.

The digital signal output from the A/D block 214 may be communicated as input signal 402 to the CPP block 432. For example, processor 432a may generate a set of channel estimates and lock indicators, $(\hat{h}1,L1)$, and a timing reference signal T1. Processor 432b may generate a set a channel estimates and lock indicators, $(\hat{h}2,L2)$, and a timing reference signal T2. Processor 432a and processor 432b may generate channel estimates and timing reference signals based on received signals from a single base station. There may be a deterministic relationship between the timing reference signals such that given, for example, T1, it may be possible to determine T2, and/or vice versa. In such case, only one timing reference signal, T, which may be based on at least one of T1 or T2, may be communicated to the maximum-ratio combining block 424.

The maximum-ratio combining block 424 may be adapted to utilize the channel estimates and lock indicators $(\hat{h}1,L1)$, $(\hat{h}2,L2)$ and timing information T per base station to assign rake fingers to received individual distinct path signals and to assign proportionality constants to each finger. Received individual distinct path signals may be processed in the maximum-ratio combining block 424 as signal clusters comprising a plurality of received individual distinct path signals. In an embodiment of the invention, the maximum-ratio combining block 424 may assign a time, T(n), to the nth grid element of the CPP 432, where the plurality of times T(n) may be based on the timing reference T. Given a time assignment, and a time offset, toff, a given CPP 432, n, may detect an individual distinct path signal that is received during a time interval starting at [T(n)−toff/2], and ending at [T(n)+toff/2].

The individual distinct path signals received collectively for each CPP 432 may constitute a signal cluster. The relationship of the values T(n) among the processing elements of the CPP 432 in the receiver may be such that T(n+1)−T(n) is equal to a constant value for values of n among the set of fingers. Thus, once T is determined, the timing relationships for the receipt of the plurality of individual distinct path signals constituent in the signal cluster may be determined. The time offset value, toff, may represent a time duration, which is at least as long as the period of time required for transmitting the plurality of chips contained in a symbol. For example, if the symbol comprises 16 chips, and the W-CDMA chip rate is 3.84×106 chips/second, then the time offset toff may be (16/3.84×106) seconds or approximately 4 microseconds.

Embodiments of the invention may not be limited to values of the difference T(n+1)−T(n) being constant among all n fingers in a rake receiver. However, each value, T(n), may be based on the timing reference signal, T.

The maximum-ratio combining block 424 may proportionately scale and add the received individual distinct path signals to produce a chip level output, which may be communicated to the despreader block 426. The despreader block 426 may be adapted to despread the chip level signal received from the maximum-ratio combining block 424 to generate estimates of the original transmitted signals. The diversity processor block 428 may be adapted to provide diversity processing and to generate output data estimates on a per base station basis. The macrocell combiner block 430 may achieve macroscopic diversity when a received signal has been transmitted by a plurality of base stations. The bit rate processing block 431 may perform processing tasks comprising depuncture and deinterleave on received frames of data that are communicated in received individual distinct path signals. The bit rate processing block 431 may determine a rate at which to communicate processed frames of data to the convolutional decoder block 438, and/or the turbo decoder block 440. The convolution decoder block 438 may be adapted to perform convolutional decoding on the voice portion of the signal generated from an output of the bit rate processing block 431. The turbo decoder block 440 may be adapted to perform turbo decoding on the data portion of the signal generated from an output of the bit rate processing block 431.

Figure 4B:
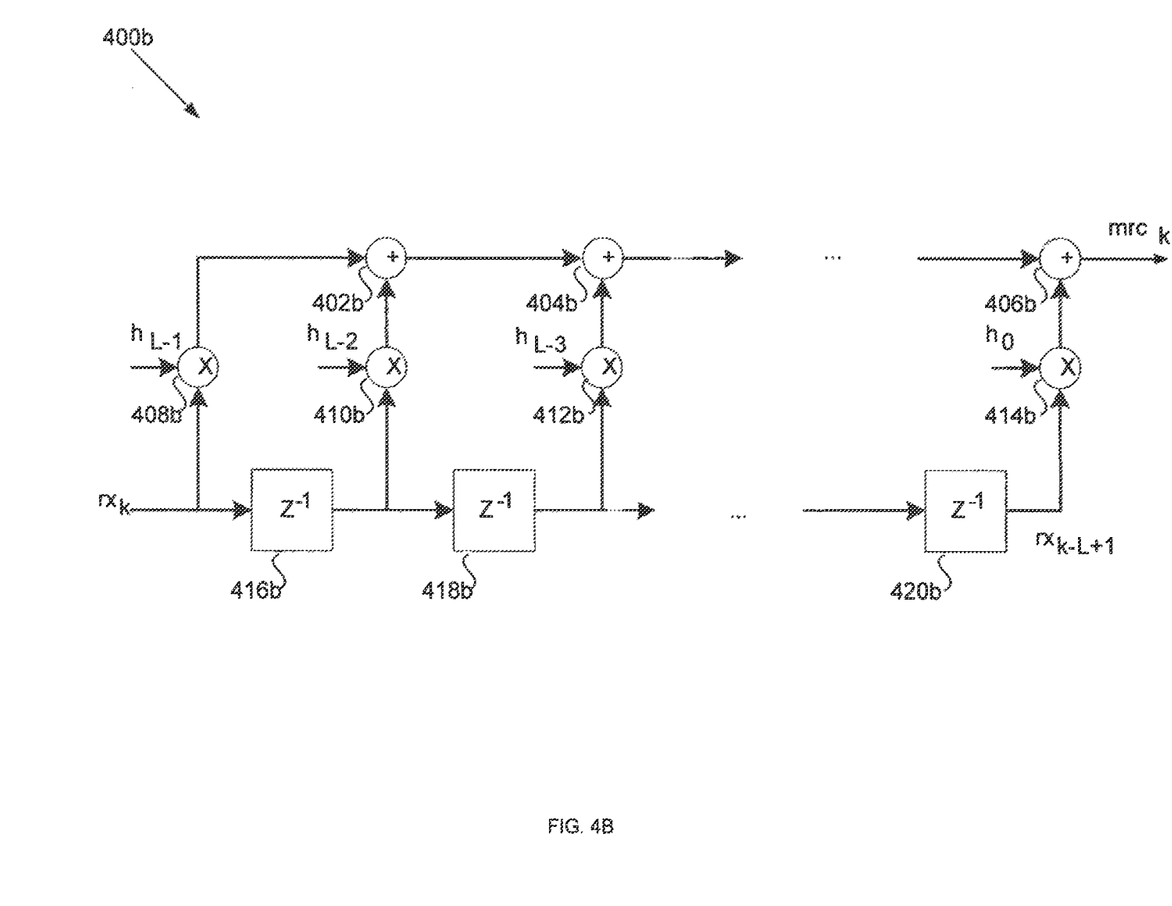
FIG. 4B illustrates an exemplary maximum-ratio combining (MRC) block, in accordance with an embodiment of the invention.

FIG. 4B illustrates an exemplary maximum-ratio combining (MRC) block, in accordance with an embodiment of the invention. Referring to FIG. 4B, the maximum-ratio combining (MRC) block 400b may comprise a plurality of adders 402b, ..., 406b, a plurality of multipliers 408b, ..., 414b, and a plurality of delay blocks 416b, ..., 420b. In one embodiment of the invention, the MRC block 400b may receive a plurality of channel estimates $h_{ik}$ (i=0, 1, ..., L−1) from a corresponding cluster path processor block. For example, the MRC block 400b may receive estimate vectors ĥ1 and ĥ2 of the actual time varying impulse response of a channel, from a cluster path processor. Each of the estimate vectors ĥ1 and ĥ2 may comprise a cluster grid of channel estimates $h_{ik}$ (i=0, 1, ..., L−1), where L may indicate the width of the cluster grid of estimates and may be related to the delay spread of the channel.

In operation, the MRC block 400b may be adapted to implement the following equation:

$$mrc_k = \sum_{i=0}^{L-1} h_{L-1-i} \cdot rx_{k-i},$$

where $mrc_k$ is the output of the MRC block 400b, hL−1−I is the plurality of channel estimates corresponding to a channel estimate vector, such as ĥ1 and ĥ2, and $rx_k$ is a filtered complex input signal. The MRC block 400b may be adapted to add individual distinct path signals together in such a manner to achieve a high signal to noise ratio (SNR) in an output signal $mrc_k$.

The MRC block 400b may receive a filtered complex signal $rx_k$ from a chip matched filter (CMF), for example. The filtered complex signal $rx_k$ may comprise in-phase (I) and quadrature (Q) components of a received signal. Furthermore, the filtered complex signal $rx_k$ may be gated by cluster path processor (CPP) output strobes derived from a CPP timing reference, for example. Channel estimates $h_{ik}$ (i=0, 1, ..., L−1) may be applied to the CMF output $rx_k$ beginning with the last in time, hL−1, and proceeding with channel estimates hL−2, ..., h0, utilizing multiplier blocks 408b, ..., 414b, respectively. The filtered complex input signal $rx_k$ may be continuously delayed by delay blocks 416b, ..., 420b. Each delayed output of the delay blocks 416b, ..., 420b may be multiplied by the multiplier blocks 410b, ..., 414b, respectively, utilizing corresponding channel estimates $h_{ik}$. The outputs of the multipliers 402b, ..., 406b may be added to generate the output signal $mrc_k$, thereby implementing the above-referenced MRC equation.

Figure 5:
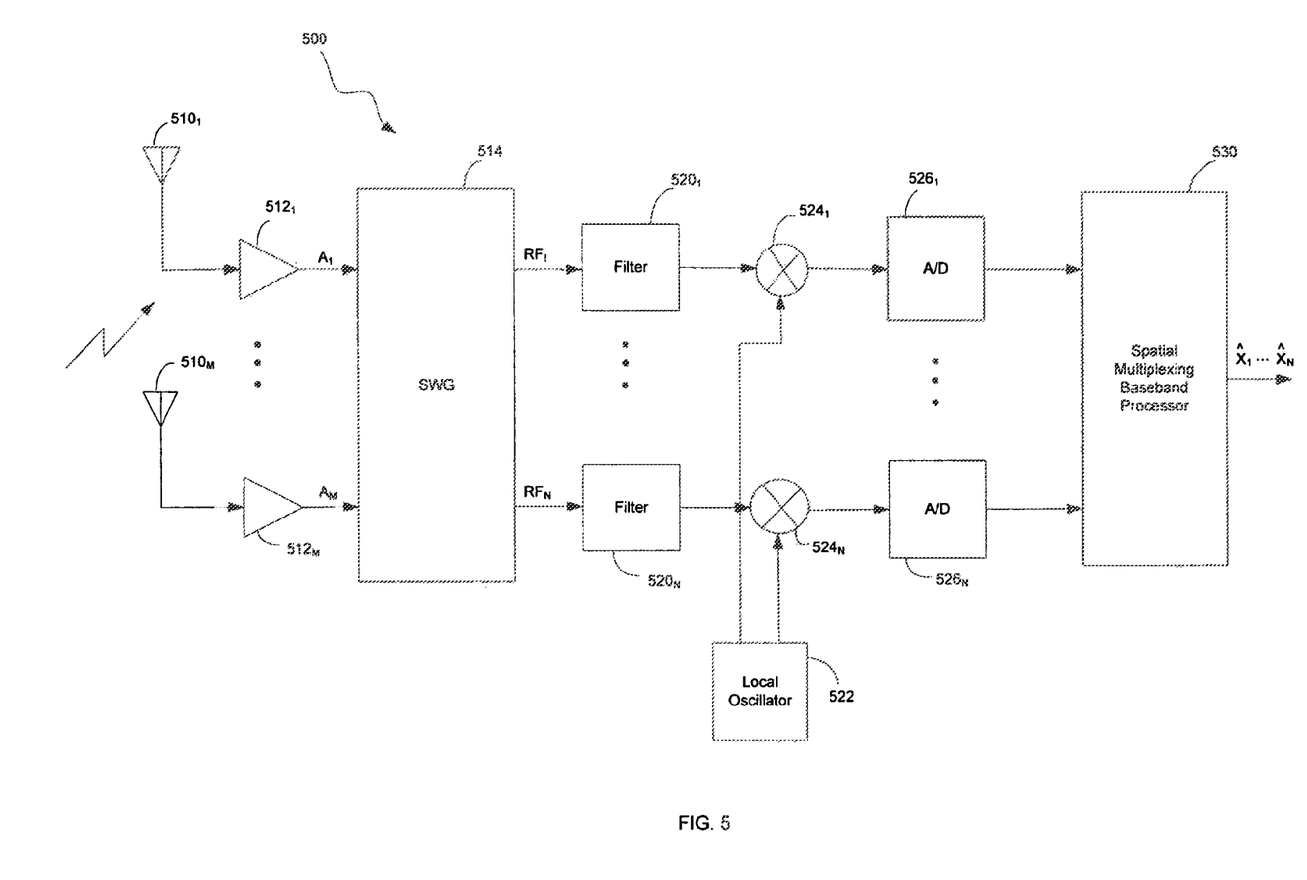
FIG. 5 is a block diagram of an exemplary receiver illustrating spatial multiplexing in a MIMO communication system that may be utilized in connection with an embodiment of the invention.

FIG. 5 is a block diagram of an exemplary receiver illustrating spatial multiplexing in a MIMO communication system that may be utilized in connection with an embodiment of the invention. Referring to FIG. 5, there is shown a receiver 500 that comprises a plurality of receive antennas $510_{1, 2, \ldots, M}$, a plurality of amplifiers $512_{1, 2, \ldots, M}$, a SWG block 514, a plurality of filters $520_{1, 2, \ldots, N}$, a local oscillator 522, a plurality of mixers $524_{1, 2, \ldots, N}$, a plurality of analog to digital (A/D) converters $526_{1, 2, \ldots, N}$ and a spatial multiplexing baseband processor SMBB 530.

The antennas $510_{1, 2, \ldots, M}$ may be adapted to receive the transmitted signals The amplifiers $512_{1, 2, \ldots, M}$ may be adapted to amplify the M received input signals. The SWG block 514 may comprise a plurality of amplitude and phase shifters to compensate for the phase difference between various received input signals. Weights may be applied to each of the input signals $A_{1 \ldots M}$ to modify the phase and amplitude of a portion of the transmitted signals received by the plurality of receive antennas $512_{1 \ldots M}$ and generate a plurality of output signals $RF_{1 \ldots N}$. The plurality of filters $520_{1, 2, \ldots, N}$ may be adapted to filter frequency components of the RF substreams. The mixers $524_{1, 2, \ldots, N}$ may be adapted to downconvert the analog RF substreams to baseband. The local oscillator 522 may be adapted to provide a signal to the mixers $524_{1, 2, \ldots, N}$, which is utilized to downconvert the analog RF substreams to baseband. The analog to digital (A/D) converters $526_{1, 2, \ldots, N}$ may be adapted to convert the analog baseband substreams into their corresponding digital substreams. The spatial multiplexing baseband processor SMBB 530 may be adapted to process the digital baseband substreams and multiplex the plurality of digital signals to generate output signals or symbols $\hat{X}_1 \ldots \hat{X}_N$ which may be estimates of the original spatial multiplexing sub-stream signals or symbols $X_1 \ldots X_N$.

In operation, the MT RF signals transmitted by a plurality of transmitters may be received by a plurality of M receive antennas $510_{1, 2, \ldots, M}$ deployed at the receiver 500. Each of the M received signals may be amplified by a respective low noise amplifier $512_{1, 2, \ldots, M}$. A plurality of weights may be applied to each of the input signals $A_{1 \ldots M}$ to modify the phase and amplitude of a portion of the transmitted signals received by the plurality of receive antennas $512_{1 \ldots M}$. A plurality of output signals $RF_{1 \ldots N}$ may be generated, which may be filtered by a plurality of filters $520_{1, 2, \ldots, N}$. The resulting N filtered signals may then be downconverted to baseband utilizing a plurality of N mixers $524_{1, 2, \ldots, N}$, each of which may be provided with a carrier signal that may be generated by a local oscillator 522. The N baseband signals generated by the mixers $524_{1, 2, \ldots, N}$ may then be converted to digital signals by a plurality of analog to digital (A/D) converters $526_{1, 2, \ldots, N}$. The N digital signals may further be processed by a spatial multiplexing baseband processor SMBB 530 to generate an output signals $\hat{X}_1 \ldots \hat{X}_N$, which are estimates of the original spatial multiplexing sub-stream signals or symbols $X_1 \ldots X_N$.

Figure 6:
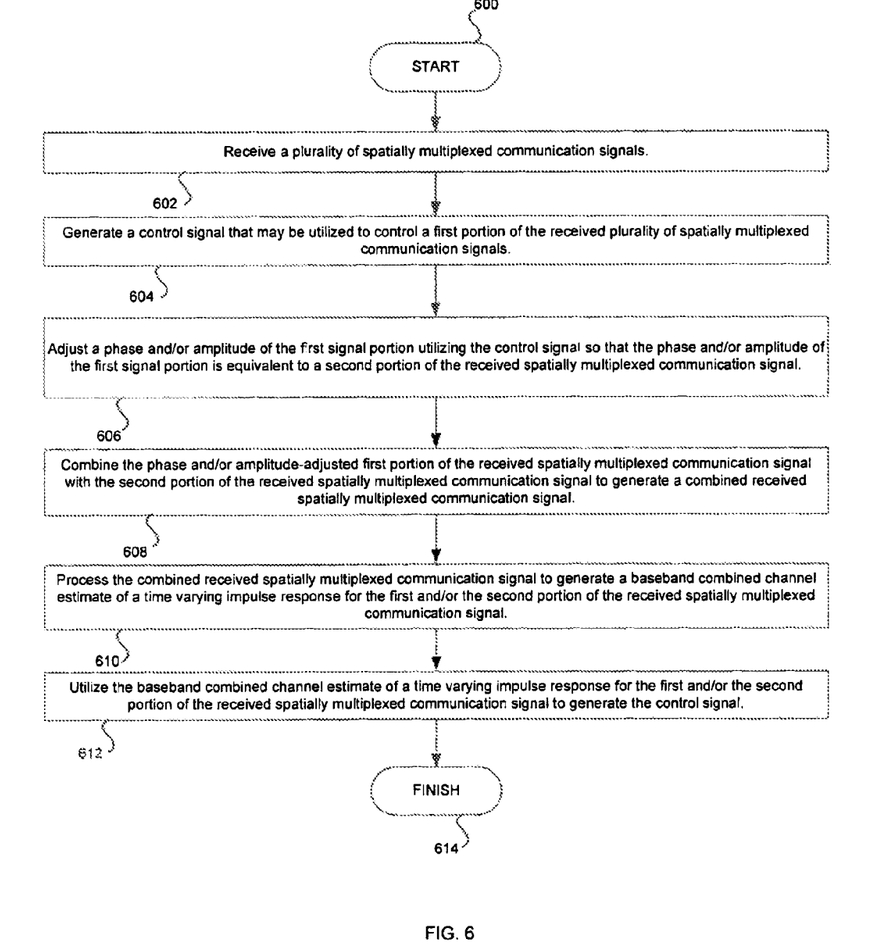
FIG. 6 is a flow diagram illustrating exemplary steps for processing signals in a receiver, in accordance with an embodiment of the invention.

FIG. 6 is a flow diagram illustrating exemplary steps for processing signals in a communication system, in accordance with an embodiment of the invention. Referring to FIG. 6, exemplary steps may start at step 600. At step 602, a plurality of spatially multiplexed communication signals may be received in a MIMO receiver. At step 604, a plurality of control signals may be generated, which may be utilized to control at least a first portion of the received plurality of spatially multiplexed communication signals. At step 606, a phase and/or amplitude of the first signal portion may be adjusted utilizing the plurality of control signals so that the phase and/or amplitude of the first signal portion is equivalent to a second portion of the received plurality of spatially multiplexed communication signals. At step 608, the phase and/or amplitude-adjusted first portion of the received plurality of spatially multiplexed communication signals may be combined with the second portion of the received plurality of spatially multiplexed communication signals to generate a combined received spatially multiplexed communication signal. At step 610, the combined received spatially multiplexed communication signal may be subsequently processed to generate a plurality of baseband combined channel estimates of a time varying impulse response for the first and/or the second portion of the received plurality of spatially multiplexed communication signals. At step 612, the plurality of baseband combined channel estimates of a time varying impulse response for the first and/or the second portion of the received spatially multiplexed communication signal may be utilized by a single weight generator to generate a plurality of control signals. The exemplary steps may end at step 614.

Aspects of the system may comprise generating a plurality of control signals $A_{11}, \phi_{11}$ 142$_{11}$ to $A_{PM-1}, \phi_{PM-1}$ 142$_{PM-1}$, by a weight generator SWG 140, where the control signals $A_{11}, \phi_{11}$ 142$_{11}$ to $A_{1M-1}, \phi_{1M-1}$ 142$_{1M-1}$ may be utilized to control at least a first of the plurality of received spatially multiplexed communication signals from the plurality of receive antennas 124$_{1 \ldots M}$. A phase and/or an amplitude of the first of the plurality of received spatially multiplexed communication signals may be adjusted by the SMBB 138 via the plurality of generated control signals $A_{11}, \phi_{11}$ 142$_{11}$ to $A_{1M-1}, \phi_{1M-1}$ 142$_{1M-1}$, so that the phase and/or the amplitude of the first received spatially multiplexed communication signal may be equivalent or different to a phase and/or amplitude of a second received spatially multiplexed communication signal, where the phase and/or the amplitude of the first received spatially multiplexed communication signal is adjusted within a processing path used to process the first received spatially multiplexed communication signal.

The generated control signals may comprise single weight signals. The amplitude of the first received spatially multiplexed communication signal may be adjusted continuously and/or at discrete intervals. An amplifier LNA 128 may amplify the first received spatially multiplexed communication signal so that a gain of the first received spatially multiplexed communication signal may be equivalent or different to a gain of the second received spatially multiplexed communication signal. A summer 136$_1$ may be adapted to combine the amplitude-adjusted first received spatially multiplexed communication signal with the second received spatially multiplexed communication signal to generate a combined received spatially multiplexed communication signal. The SMBB 138 may generate a plurality of baseband combined channel estimates of a time varying impulse response for the plurality of received spatially multiplexed communication signals and the baseband combined channel estimates of the time varying impulse response may be utilized to generate the plurality of control signals $A_{11}, \phi_{11}$ 142$_{11}$ to $A_{PM-1}, \phi_{PM-1}$ 142$_{PM-1}$. The weight generator SWG 140 may generate the control signals utilizing one or more optimization algorithms, such as a maximum signal-to-noise ratio (SNR) algorithm, a maximum signal-to-interference-and-noise ratio (SINR) algorithm, and/or a minimum bit error rate (BER) algorithm Choosing which adaptive algorithm to use will be based upon the implementation complexity and performance tradeoffs between the different cost functions.

Accordingly, the present invention may be realized in hardware, software, firmware or a combination of hardware, software and/or firmware. Some embodiments according to some aspects of the present invention may be realized, for example, in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Some embodiments according to some aspects of the present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals in a communication system, comprising:
    receiving first and second spatially multiplexed communication signals;
    generating a control signal using a channel estimate based on the received first and second spatially multiplexed communication signals;
    adjusting an amplitude of a first spatially multiplexed communication signal using the control signal so that the amplitude of the first spatially multiplexed communication signal is equivalent to an amplitude of a second spatially multiplexed communication signal;
    combining the first and second spatially multiplexed communication signal to form a combined spatially multiplexed communication signal; and
    generating a new control signal based on a channel estimate of an impulse response of the combined spatially multiplexed communication signal.

2. The method of claim 1, further comprising adjusting a phase of the first spatially multiplexed communication signal to be equivalent to a phase of a second spatially multiplexed communication signal.

3. The method of claim 1, further comprising continuously adjusting the amplitude of the first spatially multiplexed communication signal.

4. The method of claim 1, further comprising adjusting the amplitude of the first spatially multiplexed communication signal at discrete intervals.

5. The method of claim 1, further comprising amplifying the first spatially multiplexed communication signal so that it has a gain that is equivalent to a gain of the second spatially multiplexed communication signal.

6. The method of claim 1, further comprising combining the amplitude-adjusted first spatially multiplexed communication signal with the second spatially multiplexed communication signal to generate a combined received spatially multiplexed communication signal.

7. The method of claim 1, further comprising generating the control signal utilizing an optimization algorithm comprising at least one of a maximum signal-to-noise ratio (SNR) algorithm, a maximum signal-to-interference-and-noise ratio (SINR) algorithm, and a minimum bit error rate (BER) algorithm.

8. The method of claim 1, wherein the control signal is a single weight control signal.

9. The method of claim 1, wherein the channel estimate based on the received first and second spatially multiplexed communication signals is a baseband combined channel estimate for a plurality of received spatially multiplexed communication signals.

10. The method of clam 1, wherein the channel estimate based on the received first and second spatially multiplexed communication signals is also based on a third received spatially multiplexed communication signal.

11. A system for processing signals in a communication system, comprising:
one or more processors and/or circuits configured to:
generate a channel estimate based on a first spatially multiplexed communication signal and a second spatially multiplexed communication signal;
generate a control signal based on the channel estimate;
adjust an amplitude of the first spatially multiplexed communication signal using the control signal so that the amplitude of the first spatially multiplexed communication signal is equivalent to an amplitude of the second spatially multiplexed communication signal;
combine the first spatially multiplexed communication signal with the second spatially multiplexed communication signal to form a combined spatially multiplexed communication signal; and
generate a new control signal based on a channel estimate of an impulse response of the combined spatially multiplexed communication signal.

12. The system of claim 11, wherein the one or more processors and/or circuits are further configured to adjust a phase of the first spatially multiplexed communication signal to be equivalent to a phase of a second spatially multiplexed communication signal.

13. The system of claim 11, wherein the one or more processors and/or circuits are further configured to continuously adjust the amplitude of the first spatially multiplexed communication signal.

14. The system of claim 11, wherein the one or more processors and/or circuits are further configured to adjust the amplitude of the first spatially multiplexed communication signal at discrete intervals.

15. The system of claim 11, wherein the one or more processors and/or circuits are further configured to amplify the first spatially multiplexed communication signal so that it has a gain that is equivalent to a gain of the second spatially multiplexed communication signal.

16. The system of claim 11, wherein the one or more processors and/or circuits are further configured to generate the control signal utilizing an optimization algorithm comprising at least one of a maximum signal-to-noise ratio (SNR) algorithm, a maximum signal-to-interference-and-noise ratio (SINR) algorithm, and a minimum bit error rate (BER) algorithm.

17. The system of claim 11, wherein the control signal is a single weight control signal.

18. The system of claim 11, wherein the channel estimate based on the received first and second spatially multiplexed communication signals is a baseband combined channel estimate for a plurality of received spatially multiplexed communication signals.

19. A non-transitory computer-readable medium configured to store computer instructions that, when executed by a computer, cause the computer to:
receive first and second spatially multiplexed communication signals;
generate a control signal using a baseband combined channel estimate based on the received first and second spatially multiplexed communication signals;
adjust an amplitude and of the first spatially multiplexed communication signal using the control signal so that the amplitude of the first spatially multiplexed communication signal is equivalent to an amplitude and of the second spatially multiplexed communication signal; and
combine the first and second spatially multiplexed communication signals to form a combined spatially multiplexed communication signal; and
generate a new control signal based on a channel estimate of an impulse response of the combined spatially multiplexed communication signal.

* * * * *

UNITED STATES PATENT AND TRADEMARK OFFICE
CERTIFICATE OF CORRECTION

| | | |
|---|---|---|
| PATENT NO. | : 8,605,661 B2 | Page 1 of 1 |
| APPLICATION NO. | : 13/554652 | |
| DATED | : December 10, 2013 | |
| INVENTOR(S) | : Kent et al. | |

It is certified that error appears in the above-identified patent and that said Letters Patent is hereby corrected as shown below:

In the Claims

Claim 19, Column 18, Line 27, replace "an amplitude and of" with --an amplitude of--.

Claim 19, Column 18, Line 30, replace "an amplitude and of" with --an amplitude of--.

Signed and Sealed this
Eleventh Day of March, 2014

Michelle K. Lee
*Deputy Director of the United States Patent and Trademark Office*